US011905837B2

(12) United States Patent
Overman

(10) Patent No.: US 11,905,837 B2
(45) Date of Patent: Feb. 20, 2024

(54) SEALING SYSTEM INCLUDING A SEAL ASSEMBLY BETWEEN COMPONENTS

(71) Applicant: General Electric Company, Schenectady, NY (US)

(72) Inventor: Nicholas R. Overman, Sharonville, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/656,106

(22) Filed: Mar. 23, 2022

(65) Prior Publication Data

US 2023/0304414 A1 Sep. 28, 2023

(51) Int. Cl.
*F01D 11/00* (2006.01)

(52) U.S. Cl.
CPC ........ *F01D 11/005* (2013.01); *F05D 2240/57* (2013.01); *F05D 2260/38* (2013.01)

(58) Field of Classification Search
CPC . F01D 11/005; F05D 2240/57; F05D 2260/38
See application file for complete search history.

(56) References Cited

U.S. PATENT DOCUMENTS 5,291,732 A * 3/1994 Halila .................... F23R 3/002 60/753
5,451,116 A 9/1995 Czachor et al.
6,418,727 B1 * 7/2002 Rice ........................ F01D 9/023 60/799
6,644,034 B2 * 11/2003 Ariyoshi .................. F23R 3/60 60/753
7,784,264 B2 * 8/2010 Weaver .................. F01D 9/023 60/752
8,511,972 B2 * 8/2013 Sutcu .................... F01D 11/005 415/139
8,752,395 B2 * 6/2014 McCormick ............. F23R 3/60 60/752
8,777,229 B2 * 7/2014 Davis .................... F01D 11/005 277/393
9,249,732 B2 2/2016 McAlice et al.
9,879,555 B2 * 1/2018 Moehrle .............. F01D 11/005
(Continued)

FOREIGN PATENT DOCUMENTS

EP 0913620 A2 5/1999
EP 1391582 B1 6/2014

*Primary Examiner* — Jesse S Bogue
(74) *Attorney, Agent, or Firm* — Venable LLP; David D. Leege; Michele V. Frank

(57) ABSTRACT

A sealing system for sealing between components. The sealing system includes a first component, a second component, and a seal assembly including a seal member. The first component includes a first component surface, and the second component includes a second component surface. The second component surface is oriented in a direction transverse to the first contact surface. The seal member has a plurality of contact surfaces including a first contact surface and a second contact surface. The first contact surface is configured to contact the first component surface and to slide relative to the first component surface. The second contact surface is configured to contact the second component surface and to slide relative to the second component surface. The second contact surface is oriented in a direction transverse to the first contact surface.

19 Claims, 9 Drawing Sheets

(56) References Cited

U.S. PATENT DOCUMENTS

| | | | | |
|---|---|---|---|---|
| 10,196,912 | B2 * | 2/2019 | Davis | F16J 15/3452 |
| 10,233,763 | B2 | 3/2019 | McCaffrey | |
| 10,344,609 | B2 * | 7/2019 | Davis | F01D 11/003 |
| 10,370,993 | B2 * | 8/2019 | Davis | F16J 15/104 |
| 10,378,772 | B2 * | 8/2019 | Stieg | F23R 3/002 |
| 10,690,060 | B2 | 6/2020 | White et al. | |
| 10,895,163 | B2 * | 1/2021 | Schiavo | F16J 15/0887 |
| 11,035,253 | B2 * | 6/2021 | Walker | F01D 25/04 |
| 2017/0284210 | A1 * | 10/2017 | Bartley | F01D 9/023 |
| 2018/0306120 | A1 * | 10/2018 | Shi | F23R 3/60 |
| 2020/0116360 | A1 | 4/2020 | White et al. | |
| 2020/0400030 | A1 * | 12/2020 | Mei | F16J 15/0887 |
| 2021/0033028 | A1 * | 2/2021 | Oskam | F01D 11/005 |

* cited by examiner 310
312
314
316
318

510
312
314
316
318

520
512a
512b
314
316
318

530
414a
414b
312
318

540
414a
414b
312
318

550
414a
414b
312
318

610
312
314
316
318

620
312
314
316
318

630
512a
512b
314
316
318

410
414a
414b
312
316
318

640
414a
414b
312
316
318

650
414a
414b
312
316
318

SEALING SYSTEM INCLUDING A SEAL ASSEMBLY BETWEEN COMPONENTS

TECHNICAL FIELD

The present disclosure relates to seal assemblies, particularly, seal assemblies used in a combustor for a gas turbine engine, such as gas turbine engines for aircraft.

BACKGROUND

In a gas turbine engine, a fuel and air mixture is combusted in a combustion chamber, generating combustion gases (combustion products). This combustion chamber may be formed between an inner combustion liner and an outer combustion liner. The combustion gases accelerate through an outlet as the combustion gases leave the combustion chamber and, then, drive a turbine. A nozzle may be positioned between the combustion chamber and the turbine to direct the combustion gases into the turbine. A seal may be formed between the nozzle and at least one of the combustion liners.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 3 is a cross-sectional detail view showing detail 3 in FIG. 2.

DETAILED DESCRIPTION

Figure 1:
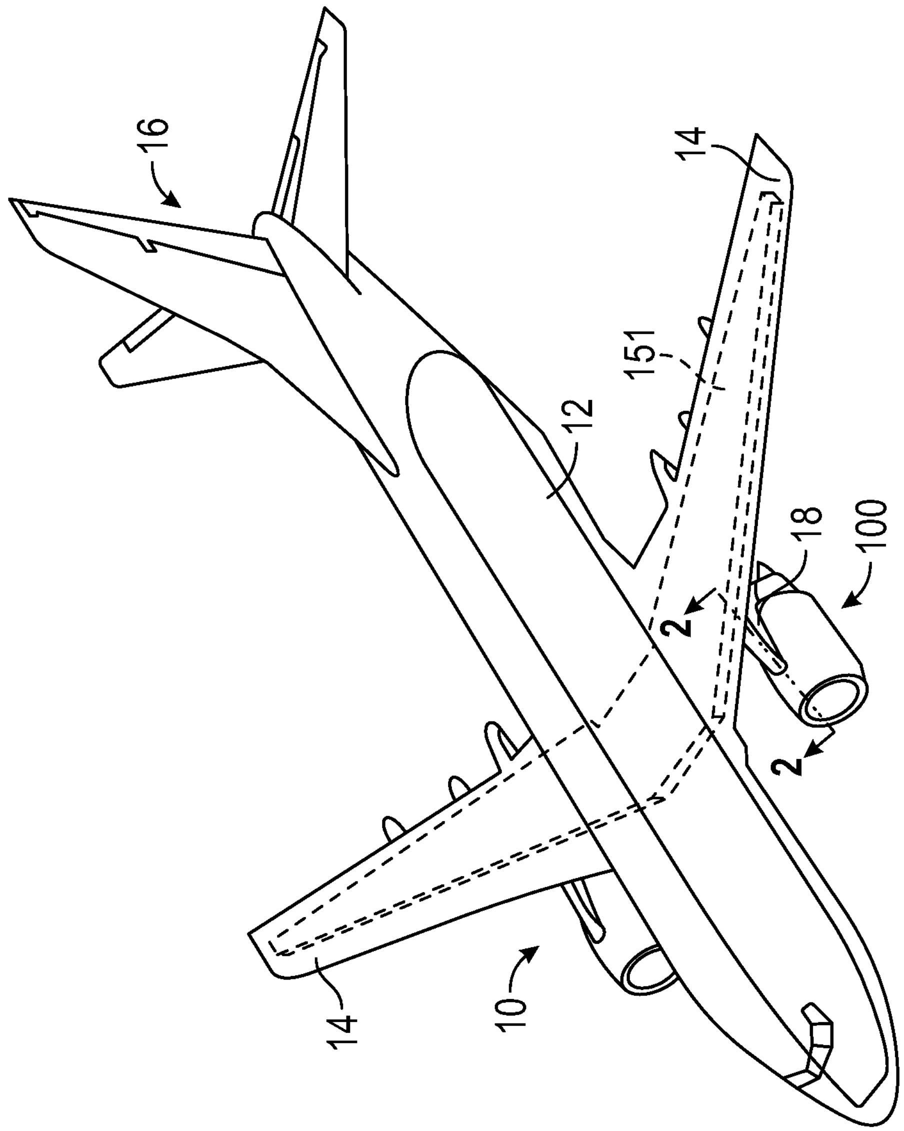
FIG. 1 is a schematic, perspective view of an aircraft having a gas turbine engine according to an embodiment of the present disclosure.

Features, advantages, and embodiments of the present disclosure are set forth or apparent from a consideration of the following detailed description, drawings, and claims. Moreover, the following detailed descriptions are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet, and aft refers to a position closer to an engine nozzle or an exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "directly upstream" or "directly downstream," when used to describe the relative placement of components in a fluid pathway, refer to components that are placed next to each other in the fluid pathway without any intervening components between them other than an appropriate fluid coupling, such as a pipe, a tube, a valve, or the like, to fluidly couple the components. Such components may be spaced apart from each other with intervening components that are not in the fluid pathway.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" is not to be limited to the precise value specified. In at least some instances, the approximating language may correspond to the precision of an instrument for measuring the value, or the precision of the methods or the machines for constructing or manufacturing the components and/or systems. For example, the approximating language may refer to being within a one, two, four, ten, fifteen, or twenty percent margin in either individual values, range(s) of values, and/or endpoints defining range(s) of values.

Here, and throughout the specification and claims, range limitations are combined and interchanged. Such ranges are identified and include all the sub-ranges contained therein unless the context or the language indicates otherwise. For example, all ranges disclosed herein are inclusive of the endpoints, and the endpoints are independently combinable with each other.

As noted above, a seal may be provided between a stage-one turbine nozzle that directs combustion products to a turbine of a gas turbine engine and at least one of the combustion liners that form the combustion chamber of a gas turbine engine. This seal allows for a controlled, deterministic amount of airflow into the stage-one nozzle and prevents backflow of combustion products. The embodiments discussed disclose seal assemblies that may be used in this location. The seal assemblies discussed herein utilize a single sealing member while simultaneously allowing for large radial and axial motion between adjacent components. The seal assemblies discussed herein facilitate the use of a wider range of materials used for components of the combustor and turbine nozzles. In particular, the large range of motion provided by these seal assemblies facilitates the use of dissimilar materials that have different thermal expansion characteristics for adjacent components. The large range of motion also facilitates a greater range of operating temperatures for the gas turbine engine. In addition, the large range of motion of the seal assemblies allows adjacent components to have variable geometries or actuated geometries.

The seal assemblies discussed herein are particularly suitable for use in engines, such as a gas turbine engine used on an aircraft. FIG. 1 is a perspective view of an aircraft 10 that may implement various preferred embodiments. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16, and the fuselage 12.

As will be described further below with reference to FIG. 2, the engines 100 shown in FIG. 1 are gas turbine engines that are each capable of selectively generating a propulsive thrust for the aircraft 10. The amount of propulsive thrust may be controlled at least in part based on a volume of fuel provided to the gas turbine engines 100 via a fuel system 150 (see FIG. 2). An aviation turbine fuel in the embodiments discussed herein is a combustible hydrocarbon liquid fuel, such as a kerosene-type fuel, having a desired carbon number. The fuel is stored in a fuel tank 151 of the fuel system 150. As shown in FIG. 1, at least a portion of the fuel tank 151 is located in each wing 14 and a portion of the fuel tank 151 is located in the fuselage 12 between the wings 14. The fuel tank 151, however, may be located at other suitable locations in the fuselage 12 or the wing 14. The fuel tank 151 may also be located entirely within the fuselage 12 or the wing 14. The fuel tank 151 may also be separate tanks instead of a single, unitary body, such as, for example, two tanks each located within a corresponding wing 14.

Although the aircraft 10 shown in FIG. 1 is an airplane, the embodiments described herein may also be applicable to other aircraft 10, including, for example, helicopters and unmanned aerial vehicles (UAV). Further, although not depicted herein, in other embodiments, the gas turbine engine may be any other suitable type of gas turbine engine, such as an industrial gas turbine engine incorporated into a power generation system, a nautical gas turbine engine, etc.

Figure 2:
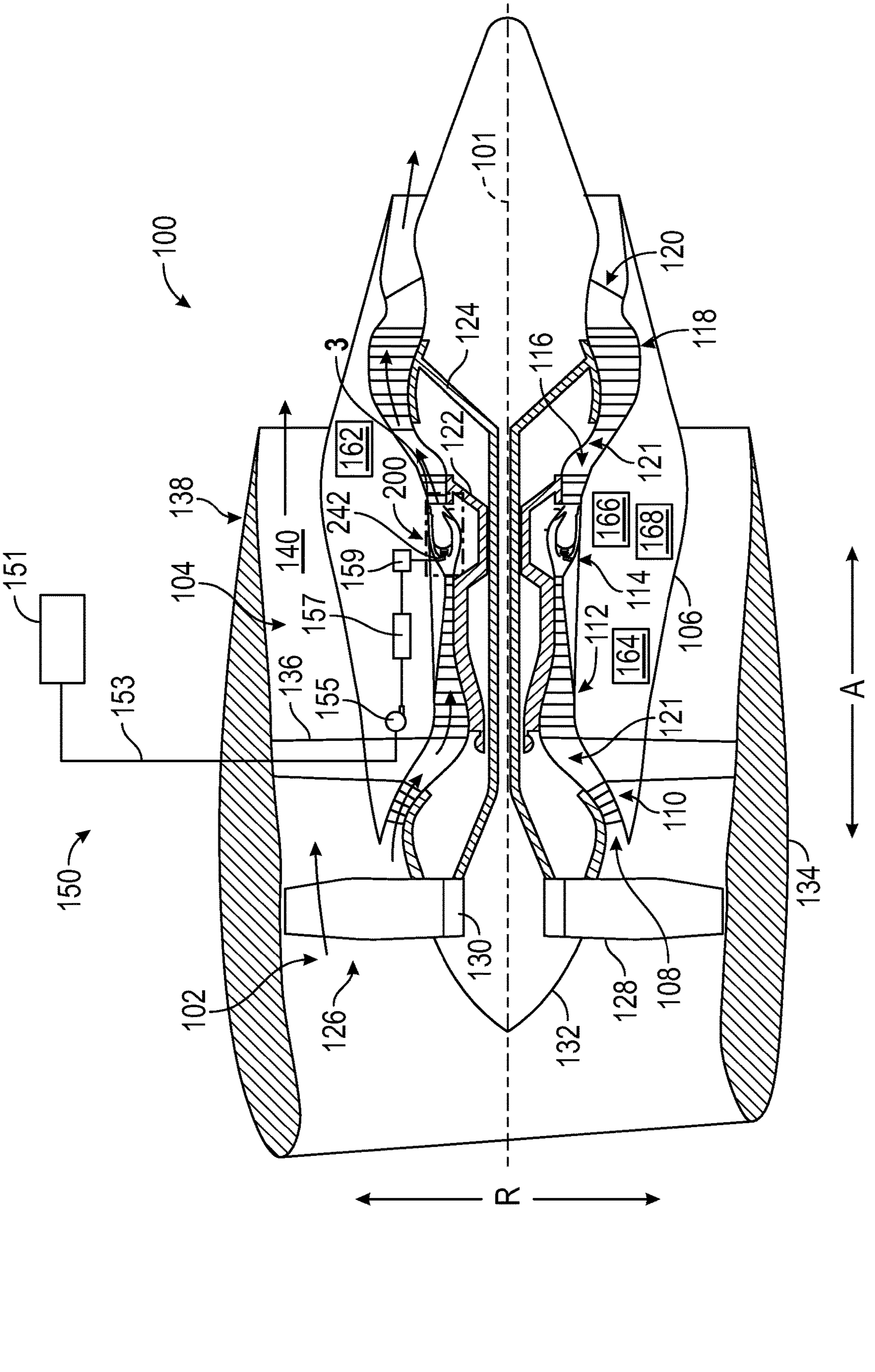
FIG. 2 is a schematic, cross-sectional view, taken along line 2-2 in FIG. 1, of the gas turbine engine of the aircraft shown in FIG. 1.

FIG. 2 is a schematic, cross-sectional view of one of the engines 100 used in the propulsion system for the aircraft 10 shown in FIG. 1. The cross-sectional view of FIG. 2 is taken along line 2-2 in FIG. 1. For the embodiment depicted in FIG. 2, the engine 100 is a high bypass turbofan engine. The engine 100 may also be referred to as a turbofan engine 100 herein. The turbofan engine 100 has an axial direction A (extending parallel to a longitudinal centerline 101, shown for reference in FIG. 2), a radial direction R, and a circumferential direction. The circumferential direction (not depicted in FIG. 2) extends in a direction rotating about the axial direction A. The turbofan engine 100 includes a fan section 102 and a turbomachine 104 disposed downstream from the fan section 102.

The turbomachine 104 depicted in FIG. 2 includes a tubular outer casing 106 (also referred to as a housing or a nacelle) that defines an inlet 108. In this embodiment, the inlet 108 is annular. The outer casing 106 encases an engine core that includes, in a serial flow relationship, a compressor section including a booster or a low-pressure (LP) compressor 110 and a high-pressure (HP) compressor 112, a combustion section 114, a turbine section including a high-pressure (HP) turbine 116 and a low-pressure (LP) turbine 118, and a jet exhaust nozzle section 120. The compressor section, the combustion section 114, and the turbine section together define at least in part a core air flowpath 121 extending from the inlet 108 to the jet exhaust nozzle section 120. The turbofan engine further includes one or more drive shafts. More specifically, the turbofan engine includes a high-pressure (HP) shaft or a spool 122 drivingly connecting the HP turbine 116 to the HP compressor 112, and a low-pressure (LP) shaft or a spool 124 drivingly connecting the LP turbine 118 to the LP compressor 110.

The fan section 102 shown in FIG. 2 includes a fan 126 having a plurality of fan blades 128 coupled to a disk 130. The fan blades 128 and the disk 130 are rotatable, together, about the longitudinal centerline (axis) 101 by the LP shaft 124. The LP compressor 110 may also be directly driven by the LP shaft 124, as depicted in FIG. 2. The disk 130 is covered by rotatable front hub 132 aerodynamically contoured to promote an airflow through the plurality of fan blades 128. Further, an annular fan casing or an outer nacelle 134 circumferentially surrounds the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104 so as to define a bypass airflow passage 140 therebetween.

The turbofan engine 100 is operable with the fuel system 150 and receives a flow of fuel from the fuel system 150. The fuel system 150 includes a fuel delivery assembly 153 providing the fuel flow from the fuel tank 151 to the turbofan engine 100, and, more specifically, to a plurality of fuel nozzles 242 that inject fuel into a combustion chamber 216 of a combustor 200 (see FIG. 3, discussed further below) of the combustion section 114. The components of the fuel system 150, and, more specifically, the fuel tank 151, is an example of a fuel source that provides fuel to the fuel nozzles 242, as discussed in more detail below. The fuel delivery assembly 153 includes tubes, pipes, conduits, and the like, to fluidly connect the various components of the fuel system 150 to the engine 100. The fuel tank 151 is configured to store the hydrocarbon fuel, and the hydrocarbon fuel is supplied from the fuel tank 151 to the fuel delivery assembly 153. The fuel delivery assembly 153 is configured to carry the hydrocarbon fuel between the fuel tank 151 and the engine 100 and, thus, provides a flow path (fluid pathway) of the hydrocarbon fuel from the fuel tank 151 to the engine 100.

The fuel system 150 includes at least one fuel pump fluidly connected to the fuel delivery assembly 153 to induce the flow of the fuel through the fuel delivery assembly 153 to the engine 100. One such pump is a main fuel pump 155. The main fuel pump 155 is a high-pressure pump that is the primary source of pressure rise in the fuel delivery assembly 153 between the fuel tank 151 and the engine 100. The main fuel pump 155 may be configured to increase a pressure in the fuel delivery assembly 153 to a pressure greater than a pressure within a combustion chamber 216 of the combustor 200.

The fuel system 150 also includes a fuel metering unit 157 in fluid communication with the fuel delivery assembly 153. Any suitable fuel metering unit 157 may be used including, for example, a metering valve. The fuel metering unit 157 is positioned downstream of the main fuel pump 155 and upstream of a fuel manifold 159 configured to distribute fuel to the fuel nozzles 242. The fuel system 150 is configured to provide the fuel to the metering unit 157, and the fuel metering unit 157 is configured to receive fuel from the fuel tank 151. The fuel metering unit 157 is further configured to provide a flow of fuel to the engine 100 in a desired manner. More specifically, the fuel metering unit 157 is configured to meter the fuel and to provide a desired volume of fuel, at, for example, a desired flow rate, to a fuel manifold 159 of the engine 100. The fuel manifold 159 is fluidly connected to the fuel nozzles 242 and distributes (provides) the fuel received to the plurality of fuel nozzles 242, where the fuel is injected into the combustion chamber 216 and combusted. Adjusting the fuel metering unit 157 changes the volume of fuel provided to the combustion chamber 216 and, thus, changes the amount of propulsive thrust produced by the engine 100 to propel the aircraft 10.

The turbofan engine 100 also includes various accessory systems to aid in the operation of the turbofan engine 100 and/or an aircraft, including the turbofan engine 100. For example, the turbofan engine 100 may include a main lubrication system 162, a compressor cooling air (CCA) system 164, an active thermal clearance control (ATCC) system 166, and a generator lubrication system 168, each of which is depicted schematically in FIG. 2. The main lubrication system 162 is configured to provide a lubricant to, for example, various bearings and gear meshes in the compressor section, the turbine section, the HP spool 122, and the LP shaft 124. The lubricant provided by the main lubrication system 162 may increase the useful life of such components and may remove a certain amount of heat from such components through the use of one or more heat exchangers. The compressor cooling air (CCA) system 164 provides air from one or both of the HP compressor 112 or the LP compressor 110 to one or both of the HP turbine 116 or the LP turbine 118. The active thermal clearance control (ATCC) system 166 acts to minimize a clearance between tips of turbine blades and casing walls as casing temperatures vary during a flight mission. The generator lubrication system 168 provides lubrication to an electronic generator (not shown), as well as cooling/heat removal for the electronic generator. The electronic generator may provide electrical power to, for example, a startup electrical motor for the turbofan engine 100 and/or various other electronic components of the turbofan engine 100 and/or an aircraft including the turbofan engine 100. The lubrication systems for the engine 100 (e.g., the main lubrication system 162 and the generator lubrication system 168) may use hydrocarbon fluids, such as oil, for lubrication, in which the oil circulates through inner surfaces of oil scavenge lines.

The turbofan engine 100 discussed herein is, of course, provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, an unducted single fan engine, and the like. In such a manner, it will further be appreciated that, in other embodiments, the gas turbine engine may have other suitable configurations, such as other suitable numbers or arrangements of shafts, compressors, turbines, fans, etc. Further, although the turbofan engine 100 is shown as a direct drive, fixed-pitch turbofan engine 100, in other embodiments, a gas turbine engine may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Further, still, in alternative embodiments, aspects of the present disclosure may be incorporated into, or otherwise utilized with, any other type of engine, such as reciprocating engines. Additionally, in still other exemplary embodiments, the exemplary turbofan engine 100 may include or be operably connected to any other suitable accessory systems. Additionally, or alternatively, the exemplary turbofan engine 100 may not include, or be operably connected to, one or more of the accessory systems 162, 164, 166, and 168, discussed above.

Figure 3:
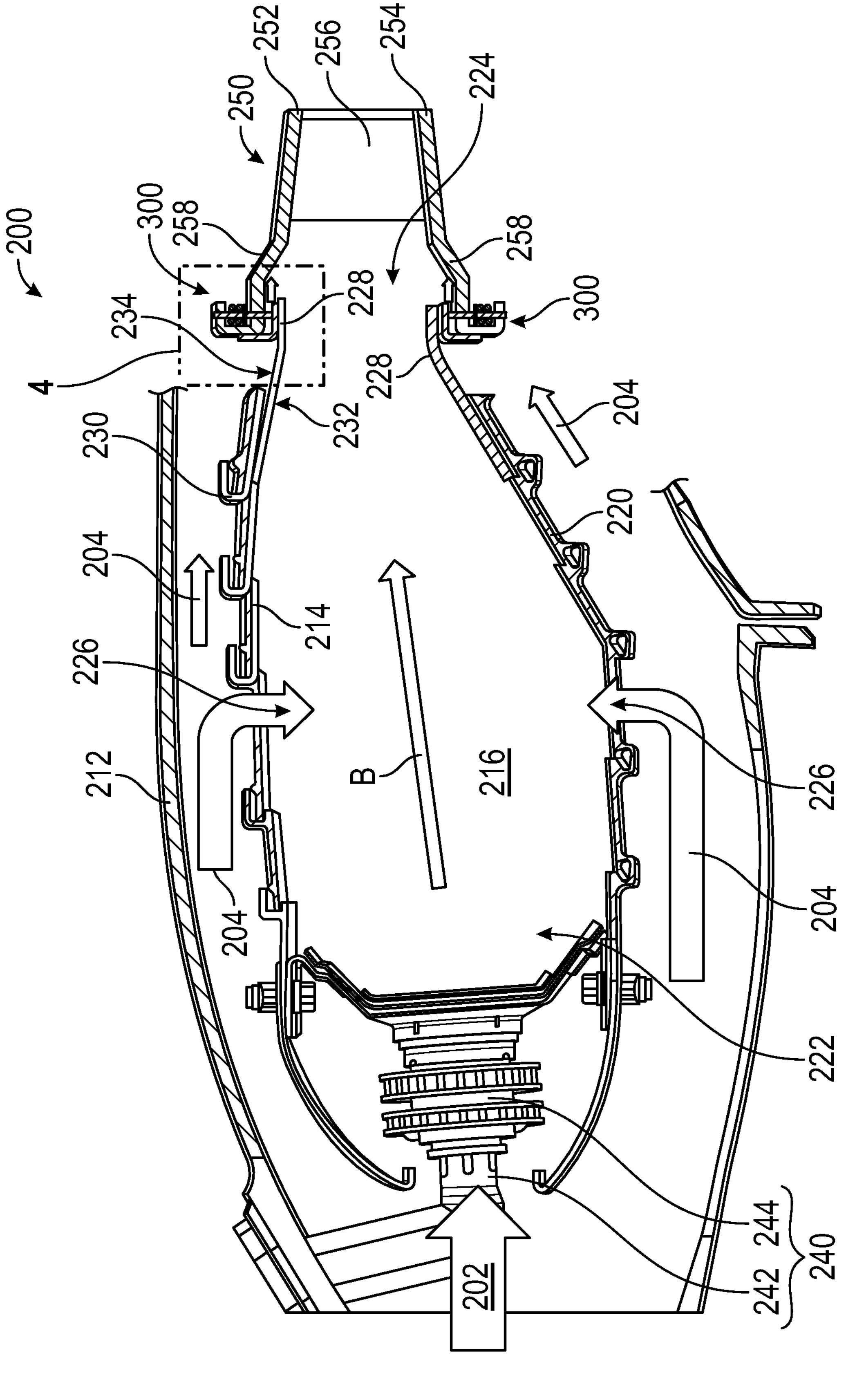
FIG. 3 shows a combustor of the gas turbine engine shown in FIG. 2.

FIG. 3 shows a combustor 200 of the combustion section 114 according to an embodiment of the present disclosure. FIG. 3 is a detail view showing detail 3 in FIG. 2. The combustor 200 includes a combustor case 212 and a combustor liner 214. The combustor liner 214 of this embodiment has a combustor inner liner 220 and a combustor outer liner 230. A combustion chamber 216 is formed within the combustor liner 214. The combustor liner 214, and, thus, also, the combustion chamber 216, has a forward end 222 and an outlet 224. A fuel nozzle 242 is positioned at the forward end 222 of the combustion chamber 216. The fuel nozzle 242 of this embodiment is part of a swirler/fuel nozzle assembly 240. In this embodiment, the combustor 200 is an annular combustor 200 and a plurality of fuel nozzles 242 is arranged in an annular configuration with the plurality of fuel nozzles 242 (the swirler/fuel nozzle assemblies 240) aligned in a circumferential direction of the combustor.

As discussed above, the compressor section, the combustor 200, and the turbine section form, at least in part, the core air flowpath 121 extending from the annular inlet 108 to the jet exhaust nozzle section 120. Air entering through the annular inlet 108 is compressed by blades of a plurality of fans of the LP compressor 110 and the HP compressor 112. A portion of the compressed air (primary air 202) enters the forward end 222 of the combustion chamber 216. Fuel is injected by the fuel nozzle 242 into the primary air 202 and mixed with the primary air 202. As noted above, the fuel nozzle 242 of this embodiment is part of a swirler/fuel nozzle assembly 240. The swirler/fuel nozzle assembly 240 includes a swirler 244 that is used to generate turbulence in the primary air 202. The fuel nozzle 242 injects fuel into the turbulent airflow of the primary air 202 and the turbulence promotes rapid mixing of the fuel with the primary air 202.

The mixture of fuel and compressed air is combusted in the combustion chamber 216, generating combustion gases (combustion products), which accelerate as the combustion gases leave the combustion chamber 216. The products of combustion are accelerated as the products are expelled through the outlet 224 to drive the engine 100. The primary air 202 thus flows in a bulk airflow direction (indicated by the arrow B in FIG. 3) from the forward end 222 of the combustion chamber 216 to the outlet 224. The terms “downstream” and “upstream” may be used to describe the position of components in the combustor 200 or locations in the combustor 200 relative to the direction of the bulk airflow B. Much of the fuel injected by the fuel nozzle 242 is combusted in a primary combustion zone in the region of the combustor 200 directly downstream of the fuel nozzle 242. The combusted fuel air mixture is then accelerated through the outlet 224 to turn the turbines (e.g., to drive the turbine blades) of the HP turbine 116 and the LP turbine 118. As discussed above the HP turbine 116 and the LP turbine 118, among other things, drive the LP compressor 110 and the HP compressor 112.

Another portion of the compressed air (dilution air 204) flows around the outside of the combustor liner 214 and is introduced into the combustion chamber 216 by a plurality of circumferentially spaced dilution holes 226 formed in the combustor inner liner 220 or the combustor outer liner 230 at positions downstream of the fuel nozzle 242.

A turbine nozzle 250 is disposed at the outlet 224 of the combustion chamber 216. The turbine nozzle 250 may be a stage-one turbine nozzle. The turbine nozzle 250 is coupled to combustor inner liner 220 and the combustor outer liner 230 at the downstream ends (aft ends 228) of each of the combustor inner liner 220 and the combustor outer liner 230. The turbine nozzle 250 of this embodiment includes an outer band 252 and an inner band 254 coupled to the combustor outer liner 230 and the combustor inner liner 220, respectively. A seal assembly 300 is located at the coupling between the combustor outer liner 230 and the outer band 252 and at the coupling between the combustor inner liner 220 and the inner band 254, as will be discussed further below. The turbine nozzle 250 further includes a plurality of circumferentially spaced vanes 256 extending between the outer band 252 and the inner band 254. The vanes 256 extend in a generally radial direction. The vanes 256 and the turbine nozzle 250 are a static component, and the vanes 256 may be curved to direct (e.g., to spin or to swirl) the combustion gases to turn the turbines (e.g., to drive the turbine blades) of the first stage of the HP turbine 116. In this embodiment, the turbine section is a multi-stage turbine and these combustion gases will drive subsequent stages of the HP turbine 116 and the LP turbine 118. The turbine nozzle 250 may, thus, also be referred to as a stage-one nozzle (S1N). As discussed above, the HP turbine 116 and the LP turbine 118, among other things, drive the LP compressor 110 and the HP compressor 112.

Figure 4:
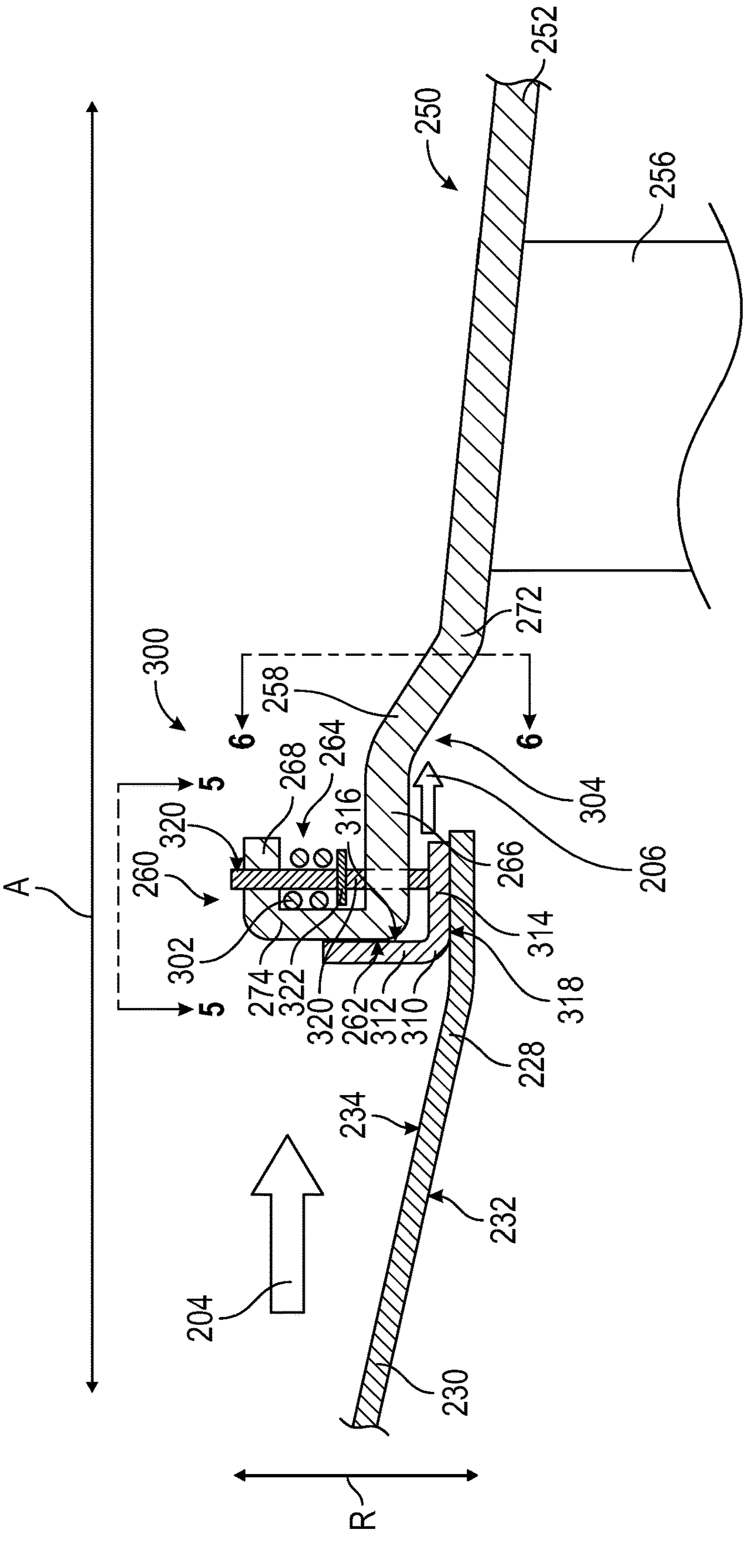
FIG. 4 is a cross-sectional detail view of a seal assembly according to an embodiment, showing detail 4 in FIG. 3.
Figure 6:
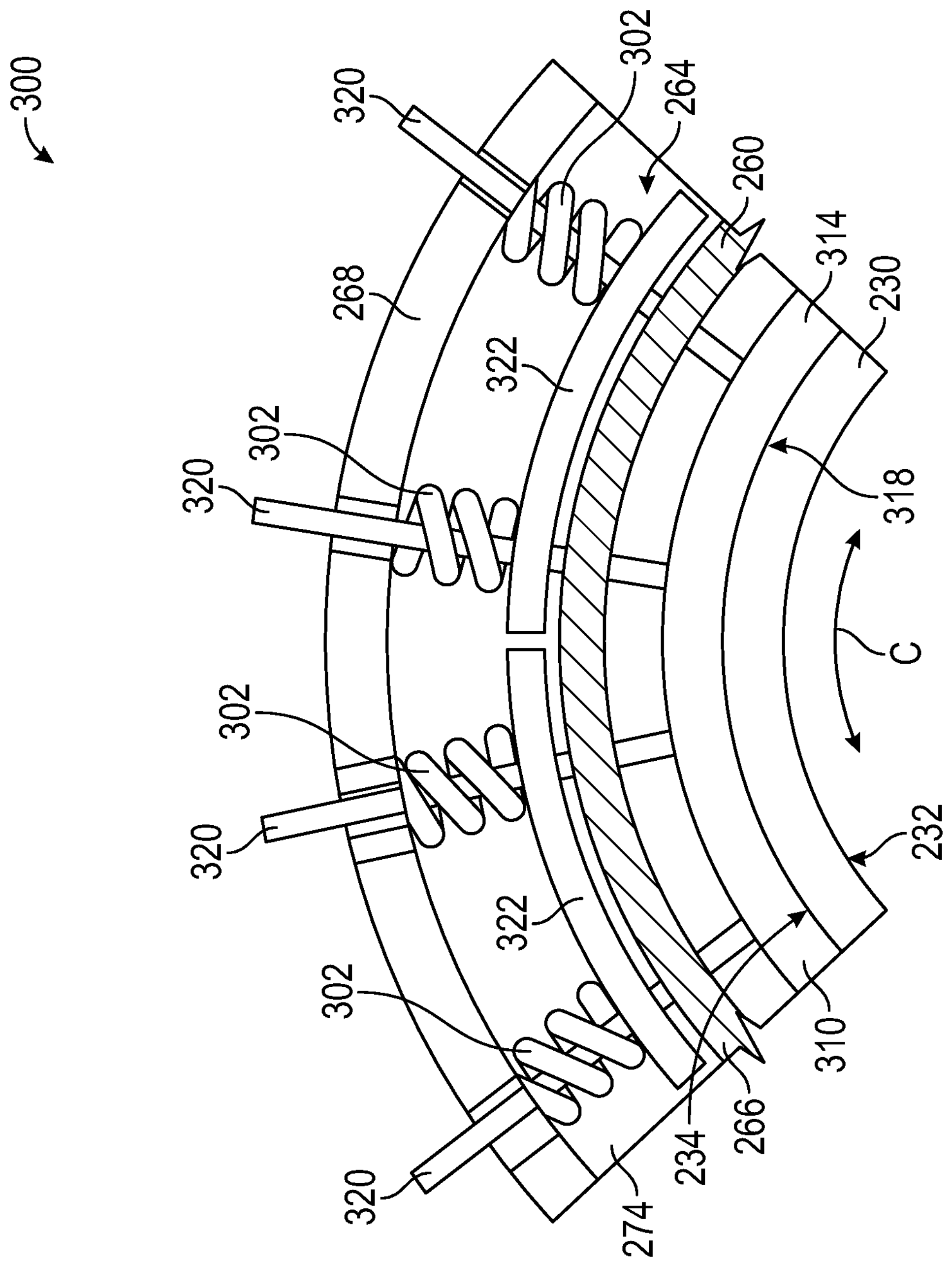
FIG. 6 is a cross-sectional view of the seal assembly shown in FIG. 4 taken along line 6-6 in FIG. 4.
Figure 5:
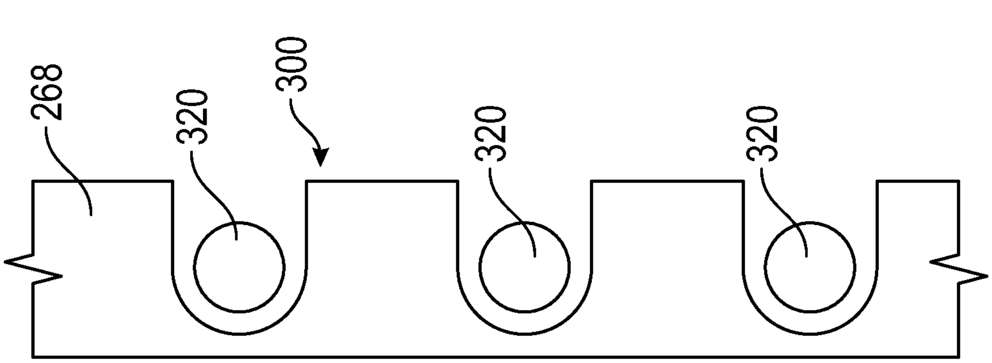
FIG. 5 is an elevational view of the seal assembly shown in FIG. 4 taken from the perspective of line 5-5 in FIG. 4.

FIGS. 4 to 6 show the seal assembly 300 between the combustor outer liner 230 and the outer band 252. FIG. 4 is a detail view showing detail 4 in FIG. 3. FIG. 5 is a top view of the seal assembly 300 taken from the perspective of line 5-5 in FIG. 4, and FIG. 6 is a cross-sectional view of the seal assembly 300 taken along line 6-6 in FIG. 4. The seal assembly 300 located at the coupling between the combustor inner liner 220 and the inner band 254 is a mirror image of the seal assembly 300 between the combustor outer liner 230 and the outer band 252, and the following discussion also applies to the seal assembly 300 located at the coupling between the combustor inner liner 220 and the inner band 254. The outer band 252 includes a forward end 258, and a flange 260 is formed on the forward end 258 of the inner band 254. The flange 260 of this embodiment is J-shaped, but, as will be discussed below, the flange 260 may have other shapes.

The seal assembly 300 includes a seal member 310. In this embodiment, the seal member 310 has an L-shape, having a radial leg 312 (radial portion) and an axial leg 314 (an axial portion), but, as will be discussed further below, the seal member 310 may have other shapes. The seal member 310 includes two sealing surfaces, a radial sealing surface 316 and an axial sealing surface 318. The radial sealing surface 316 is formed on the radial leg 312, and the axial sealing surface 318 is formed on the axial leg 314.

The radial sealing surface 316 contacts a radial surface 262 of the flange 260. Both the radial sealing surface 316 and the radial surface 262 of the flange 260 are oriented in a radial direction R of the engine 100 and extend about the downstream end 228 of the combustion outer liner 230 in the circumferential direction C of the engine 100. The radial sealing surface 316 and the radial surface 262 of the flange 260 are parallel to each other. The radial leg 312 is also oriented in a radial direction R of the engine 100 and, extends in the circumferential direction C of the engine 100. In this embodiment, the radial surface 262 is a forward-facing surface. The dilution air 204 flowing around the combustor outer liner 230 impinges on the radial leg 312 and provides a biasing force to press the radial leg 312 and, more specifically, the radial sealing surface 316, against the radial surface 262 of the flange 260, providing a seal therebetween. The radial sealing surface 316 and the radial surface 262 of the flange 260 are configured to move relative to each other in the radial direction R. More specifically, the radial sealing surface 316 and the radial surface 262 of the flange 260 slide against each other in the radial direction R to maintain the seal while allowing for relative movement of the combustor liner 214 and the turbine nozzle 250. The lengths of each of the radial sealing surface 316 and the radial surface 262 of the flange 260 are sized such that contact is made between these surfaces for the entire expected radial movement.

The combustor outer liner 230 includes an inner surface 232 facing the combustion chamber 216 and an outer surface 234 facing the combustor case 212. The axial sealing surface 318 contacts the outer surface 234 of the combustor outer liner 230. Both the axial sealing surface 318 and the outer surface 234 of the combustor outer liner 230 are oriented in an axial direction A of the engine 100 and extend in the circumferential direction C of the engine 100. The axial sealing surface 318 and the outer surface 234 of the combustor outer liner 230 are parallel to each other. The outer surface 234 of the combustor outer liner 230, thus, is an axial surface. The axial leg 314 is also oriented in an axial direction A of the engine 100 and, extends in the circumferential direction C of the engine 100. In this embodiment, a spring 302 is used to provide a biasing force to press the axial leg 314 and, more specifically, the axial sealing surface 318, against the outer surface 234 of the combustor outer liner 230, providing a seal therebetween. The axial sealing surface 318 and the outer surface 234 of the combustor outer liner 230 are configured to move relative to each other in the axial direction A. More specifically, the axial sealing surface 318 and the outer surface 234 of the combustor outer liner 230 slide against each other in the axial direction A to maintain the seal while allowing for relative movement of the combustor liner 214 and the turbine nozzle 250.

As noted above, the spring 302 provides the biasing force to press the seal member 310 and, more specifically, the axial sealing surface 318 against the outer surface 234 of the combustor outer liner 230. The biasing force is provided in a direction that is orthogonal to the axial sealing surface 318 and the outer surface 234 of the combustor outer liner 230. The spring 302 is retained in a groove 264 provided between an inner portion 266 of the flange 260 and an outer portion 268 of the flange 260. In this embodiment, the inner portion 266 is connected to the outer band 252 by a transition section 272. The inner portion 266 and the outer portion 268 are connected to each other by a radial portion 274. The radial surface 262 is formed on the radial portion 274.

In this embodiment, the seal assembly 300 includes at least one post 320 and, in this embodiment, a plurality of posts 320 connected to the axial leg 314 of the seal member 310. Each post 320 extends through holes formed in the inner portion 266 and through a U-shaped channel formed in the outer portion 268 to allow the post 320 and the flange 260 to move relative to each other in the radial direction R.

The spring 302 of this embodiment is a compression spring, and one end of the spring 302 presses against the flange 260 and, more specifically, the inner portion 266. The other end of the spring 302 presses against the seal member 310. Although shown as a coil spring, other suitable springs may be used, including, for example, leaf springs. A plurality of springs 302 may be used, and, in this embodiment, when the spring 302 is a coil spring, the spring 302 is coiled around the post 320. A collar 322 is attached to the post 320, such as by welding or the like. In this embodiment, the collar 322 is a bar that connects two adjacent posts 320, but other suitable collars 322 may be attached to the post 320 by other suitable means, such as, for example, a snap ring. The spring 302 presses on the collar 322 and, thereby, presses on the post 320 to transfer the biasing force to the axial leg 314 and, more specifically, the axial sealing surface 318.

As noted above, the seal assembly 300 is configured to have a biasing force press the radial leg 312 and, more specifically, the radial sealing surface 316, against the radial surface 262 of the flange 260, providing a seal therebetween, and the seal assembly 300 also is configured to have a biasing force press the axial leg 314 and, more specifically, the axial sealing surface 318, against the outer surface 234 of the combustor outer liner 230, providing a seal therebetween. In this embodiment, the dilution air 204 and the spring 302 are used, respectively, to provide these biasing forces, but these biasing forces may be applied by other suitable mechanisms and in other arrangements. For example, the spring 302 may be used to provide the biasing force to press the radial leg 312 and, more specifically, the radial sealing surface 316, against the radial surface 262 of the flange 260, and the dilution air 204 may be used to provide the biasing force to press the axial leg 314 and, more specifically, the axial sealing surface 318, against the outer surface 234 of the combustor outer liner 230.

The seal assembly 300 may include holes that allow a controlled amount of dilution air 204 therethrough. This air is referred to as gap flow 206. The gap flow 206 may be used to form a cooling film to cool the outer band 252 of the turbine nozzle 250. Preferably, the gap flow 206 would thus have a laminar flow along the inside surface of the outer band 252. As noted above, the inner portion 266 of the flange 260 is connected to the outer band 252 by a transition section 272. Preferably, the transition section 272 is configured to promote the laminar flow along the inside surface of the outer band 252. In this embodiment, the inner portion 266 is located radially outward of the forward end 258 of the outer band 252, and the transition section 272 extends in an axial direction as well as a radial direction to connect the inner portion 266 with the outer band 252.

The turbine nozzle 250 may be formed with a plurality of nozzle sections in the circumferential direction C of the engine 100. A single seal assembly 300 and, more specifically, a seal member 310 may be used for each of the plurality of nozzle sections. Accordingly, the engine 100 of this embodiment may have a plurality of seal assemblies 300 and, more specifically a plurality of seal members 310 arranged the circumferential direction C of the engine 100.

Figure 7:
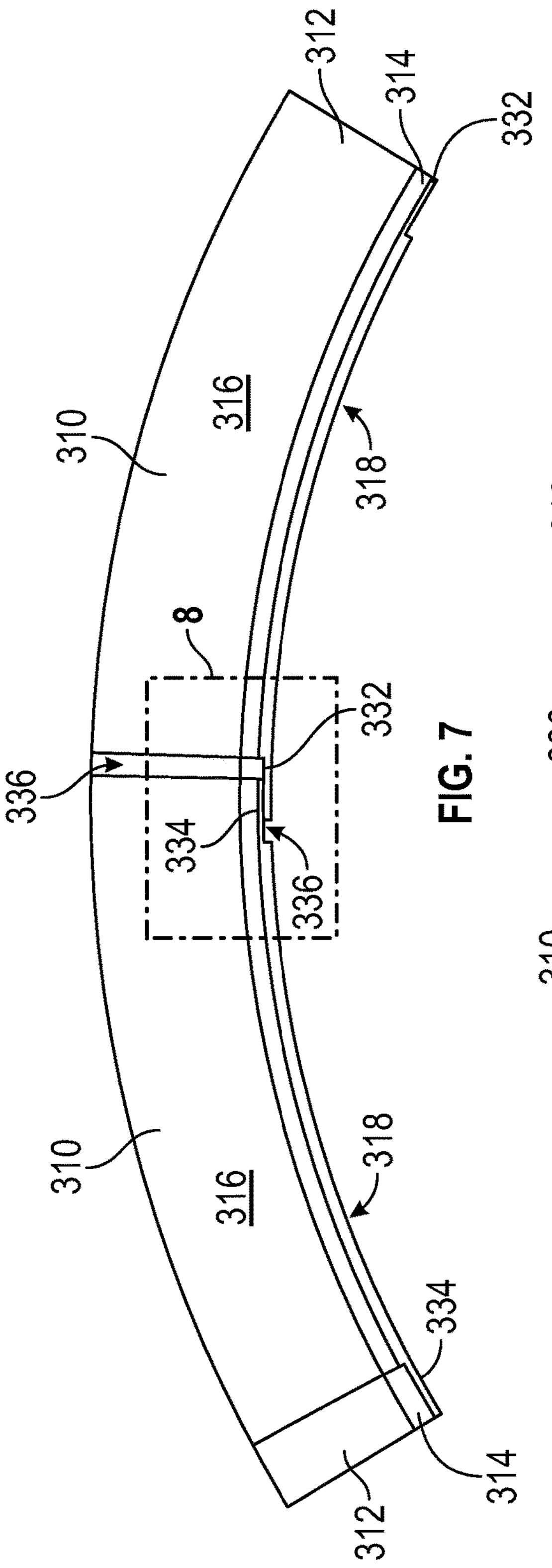
FIG. 7 shows seal members used in the seal assembly shown in FIG. 4.
Figure 8:
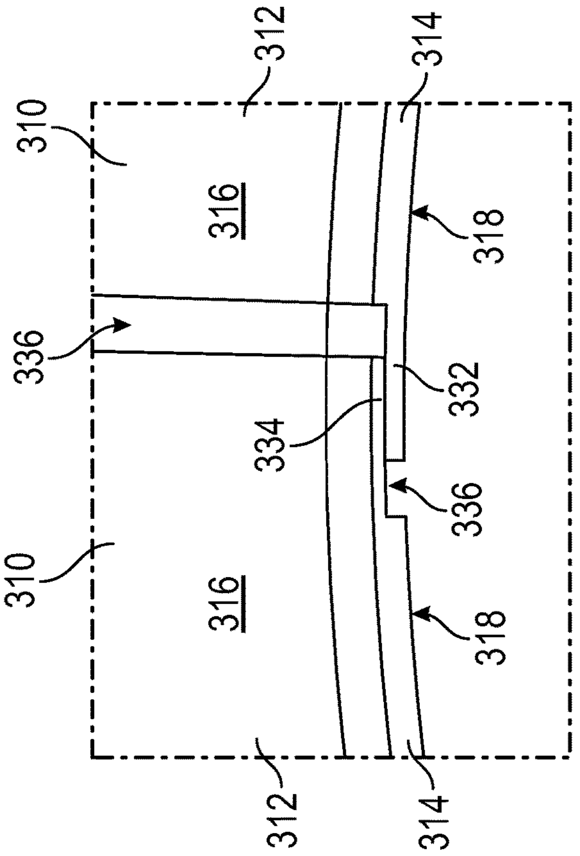
FIG. 8 is a detail view of adjacent seal members, showing detail 8 in FIG. 7.

FIG. 7 shows adjacent seal members 310, and FIG. 8 is a detail view showing detail 8 in FIG. 7. To provide for a continuous seal, adjacent seal members 310 may have an overlapping (shiplap) structure, as shown in FIGS. 7 and 8. Each seal member 310 may include a first reduced thickness portion 332 on one circumferential end of the seal member 310, and a second reduced thickness portion 334 on the other circumferential end of the seal member 310. The first reduced thickness portion 332 of one seal member 310 overlaps with the second reduced thickness portion 334 of an adjacent seal member 310 to connect the sealing surface of adjacent seal members 310. In the embodiment shown in FIGS. 7 and 8, the first reduced thickness portion 332 and the second reduced thickness portion 334 overlap with each other such that the circumferential ends adjacent to the seal members 310 do not abut each other, but form a small gap 336 that can accommodate the movement of the seal member 310.

Figure 9:
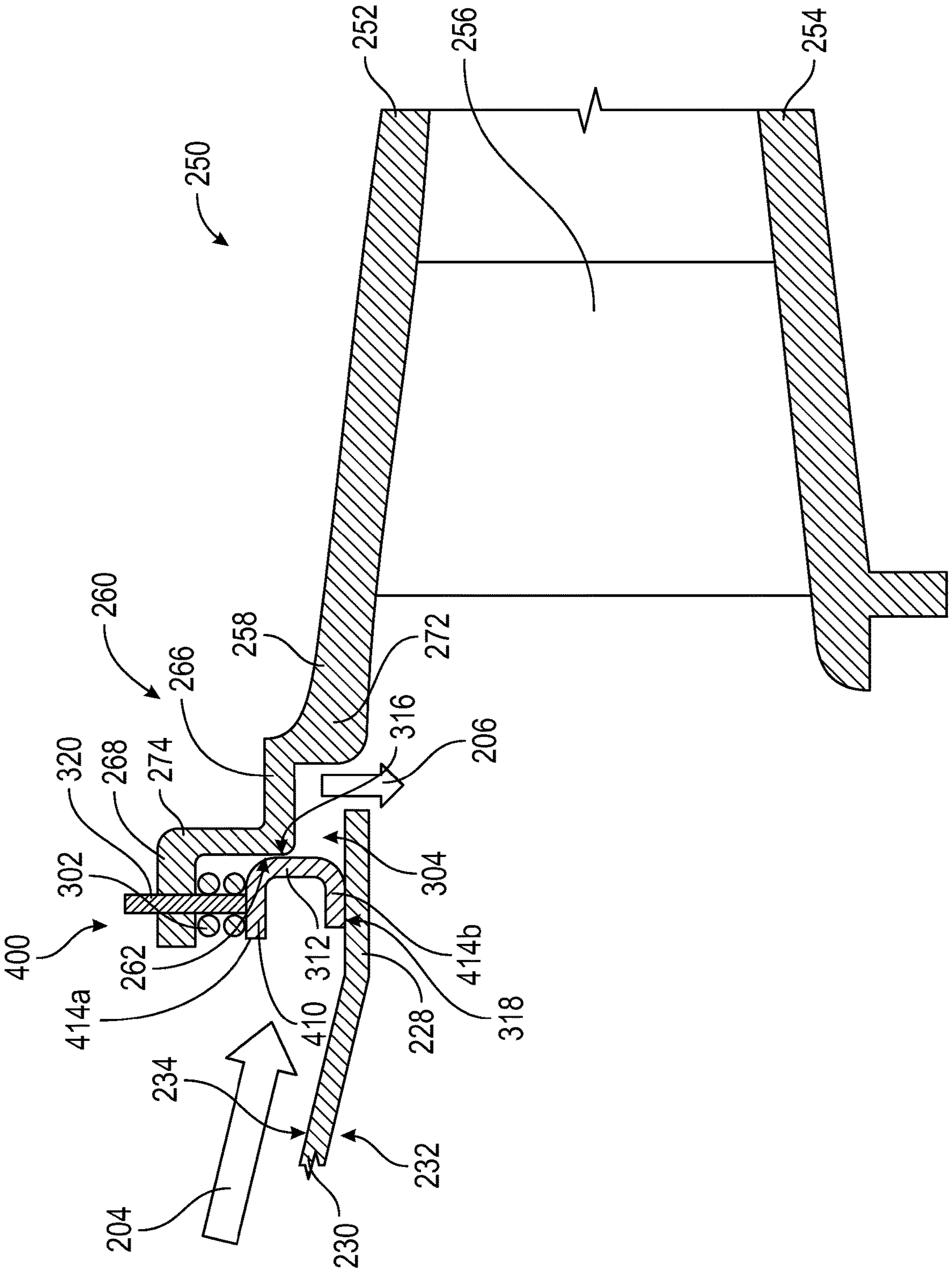
FIG. 9 is a cross-sectional detail view of a seal assembly according to another embodiment, showing detail 4 in FIG. 3.

FIG. 9 is a detail view showing detail 4 in FIG. 3 showing another seal assembly 400. In the embodiment discussed above, the seal member 310 had a L-shape, but the seal member may have other suitable shapes, and FIG. 9 illustrates another shape of the seal member. The following discussion focuses on the differences between the seal assembly 300 discussed above and the seal assembly 400 of this embodiment. The same reference numerals are used in FIG. 9 and the following discussion to indicate the same or similar components as in the embodiment discussed above and a detailed description of those components is omitted here. The seal assembly 400 of this embodiment includes a seal member 410 that has a C-shape with two axial legs, an upper axial leg 414*a*, and a lower axial leg 414*b*. The lower axial leg 414*b* is configured similarly to the axial leg 314 shown in FIG. 4 and described above. The lower axial leg 414*b* includes the axial sealing surface 318. In this embodiment, the post 320 is attached to the upper axial leg 414*a* and the spring 302 of this embodiment imparts the biasing force to the upper axial leg 414*a*. The collar 322 can be omitted in this arrangement. In this embodiment, the seal member 310 opens in a forward direction, with the radial leg 312 being located on an aft side of the seal member 410.

Figures 10A, 10B, 10C, 10D, 10E, 10F, 11A, 11B, 11C, 11D, 11E, 11F:
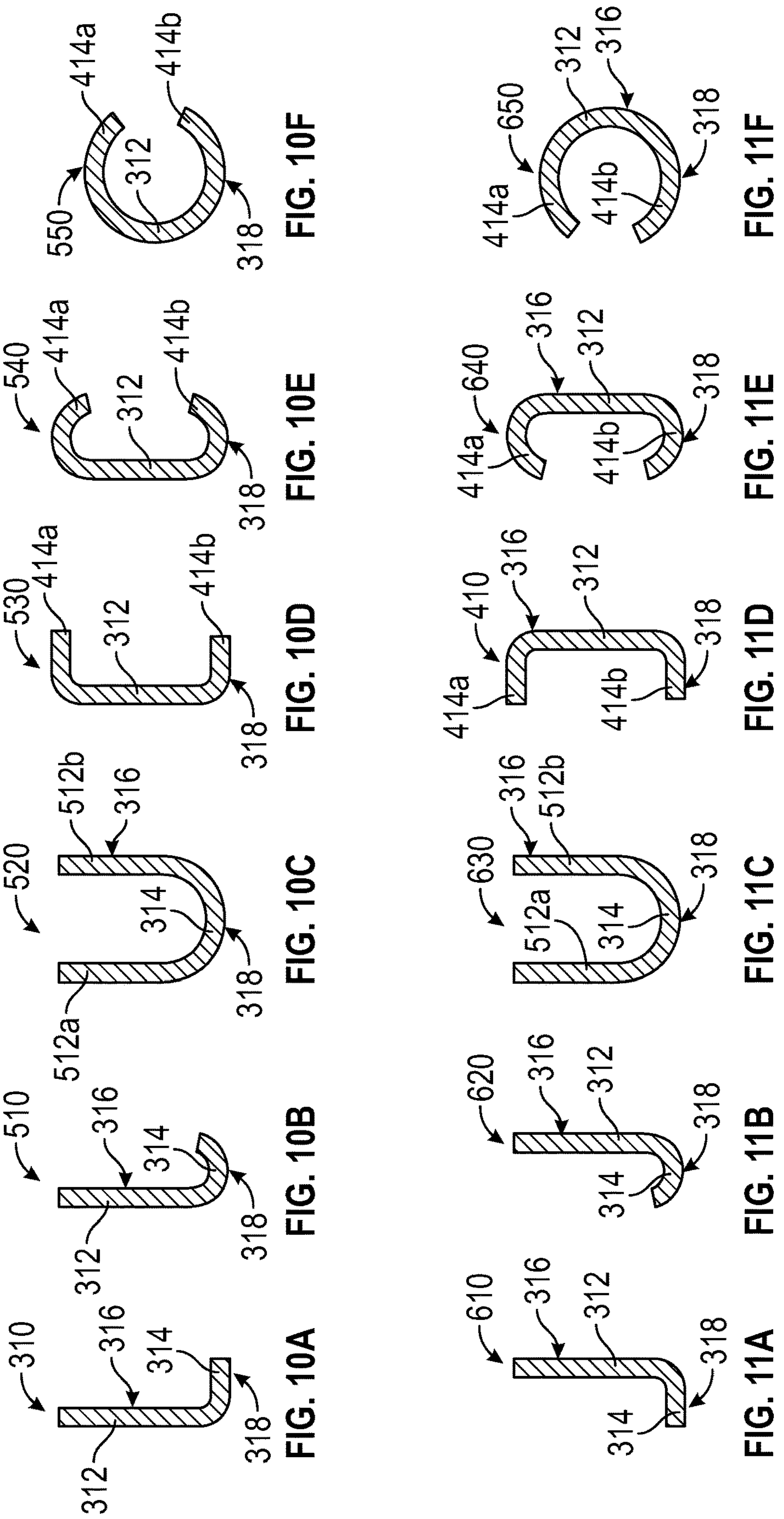
FIGS. 10A to 10F show cross sections of alternative geometries of the seal member shown in FIGS. 4 and 9.
FIGS. 11A to 11F show cross sections of alternative geometries of the seal member shown in FIGS. 4 and 9.

FIGS. 10A to 11F show additional shapes and orientations of seal members 510, 520, 530, 540, 550, 610, 620, 630, 640, 650 that may be used in the seal assemblies 300, 400 discussed herein. FIG. 10A shows the configuration of the seal member 310 of the seal assembly 300 discussed above with reference to FIG. 4, and FIG. 11D shows the seal member 410 of the seal assembly 400 discussed above with reference to FIG. 9. The seal members 510, 520, 530, 540, 550, 610, 620, 630, 640, 650 shown in FIGS. 10B to 11C, 11E, and 11F have similar components to the radial leg 312, the axial leg 314, radial sealing surface 316, axial sealing surface 318, upper axial leg 414*a*, lower axial leg 414*b*. Accordingly, these reference numerals are used in FIGS. 10B to 11C, 11E, and 11F, and a detailed description of these components is omitted here.

FIGS. 10A to 10F show seal members 310, 510, 520, 530, 540, 550 that open to the aft direction with the radial leg 312 being located on a forward side of the seal member 310, 510, 520, 530, 540, 550. FIGS. 11A to 11F show seal members 410, 610, 620, 630, 640, 650 that open to the forward direction with the radial leg 312 being located on the aft side of the seal member 410, 610, 620, 630, 640, 650. FIGS. 10A and 11A show seal members 310, 610 having an L-shape. FIGS. 10B and 11B show seal members 510, 620 having a J-shape. FIGS. 10C and 11C show seal members 520, 630 having a U-shape with the opening pointing upwards. The U-shaped seal member 310 includes two radial legs (like radial leg 312), a forward radial leg 512*a*, and an aft radial leg 512*b*. FIGS. 10D and 11D show seal members 530, 410 having a U-shape with the opening pointing forward or aft. FIGS. 10E, 10F, 11E, and 11F show seal members 540, 550, 640, 650 having a C-shape. The seal members 540, 640 shown in FIGS. 10E and 10F have a rectilinear radial leg 312, and the seal members 550, 650 shown in FIGS. 10F and 11F have a circular C-shape.

Figure 12:
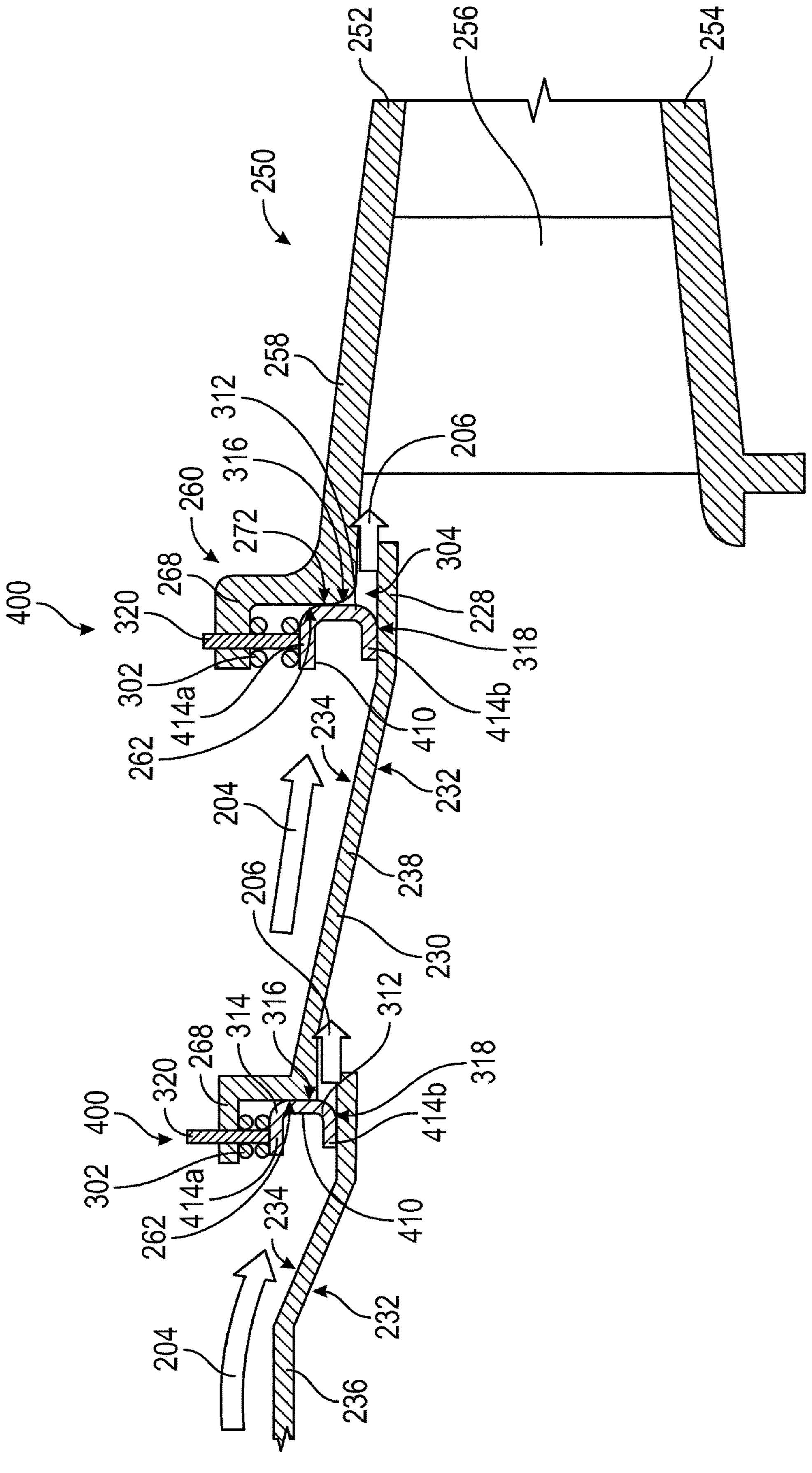
FIG. 12 shows a cross-sectional view of the seal assembly shown in FIG. 9 at another portion of the combustor, showing detail 4 in FIG. 3.

FIG. 12 shows the seal assembly 400 used at another portion of the combustor 200. As noted above, the seal assemblies 300, 400 disclosed herein may be located between many different components. In FIG. 12, the seal assembly 400 is used between portion different portions of the combustor liner 214. The combustor outer liner 230 may include, for example, an upstream liner 236 and a downstream liner 238. The seal assembly 300 is formed between the upstream liner 236 and the downstream liner 238, with the flange 260 being formed on one of the upstream liner 236 and the downstream liner 238. The flange 260 is formed on a forward end of the downstream liner 238 in the embodiment shown in FIG. 12.

Further aspects of the present disclosure are provided by the subject matter of the following clauses.

A sealing system for sealing between components. The sealing system includes a first component, a second component, and a seal assembly including a seal member. The first component includes a first component surface. The second component includes a second component surface, and the second component surface is oriented in a direction transverse to the first component surface. The seal member has a plurality of contact surfaces including a first contact surface and a second contact surface. The first contact surface is configured to contact the first component surface and to slide relative to the first component surface. The second contact surface is configured to contact the second component surface and to slide relative to the second component surface. The second contact surface is oriented in a direction transverse to the first contact surface.

The sealing system of the preceding clause, wherein the seal member has one of an L-shape, a J-shape, a C-shape, and a U-Shape.

The sealing system of any preceding clause, wherein the first component includes a flange. The first component surface is a surface of the flange.

The seal assembly of any preceding clause, wherein the seal member is configured to have at least one biasing force applied thereto to press at least one of the first contact surface and the second contact surface into contact with the first component surface and the second component surface, respectively.

The sealing system of any preceding clause, further including a spring configured to apply the biasing force to the seal member.

The sealing system of any preceding clause, wherein the seal member is configured to have an airflow contact the seal member. When the airflow contacts the seal member, the airflow provides the biasing force.

A gas turbine engine including the sealing system of any preceding clause and a combustor. The combustor includes a combustor liner. The combustor liner has a plurality of portions including an upstream portion and a downstream portion. The upstream portion is the second component, and the downstream portion is the first component.

A gas turbine engine including an annular combustor and a turbine nozzle. The annular combustor includes a combustor liner having an outer surface. The combustor liner is the second component, and the outer surface of the combustor liner is the second component surface. The annular combustor has a circumferential direction. The turbine nozzle downstream of the combustor and the turbine nozzle is the first component. the turbine nozzle includes a plurality of nozzle sections. Each nozzle section is arranged adjacent to another nozzle section in the circumferential direction. Each nozzle section includes the sealing system of any preceding clause.

The gas turbine engine of any preceding clause, wherein the seal member of one seal assembly overlaps with the seal member of an adjacent seal assembly.

The gas turbine engine of any preceding clause, wherein the overlapping portions of adjacent seal assemblies have a shiplap shape.

A gas turbine engine including the sealing system of any preceding clause, a combustor and a turbine nozzle. The combustor includes a combustor liner having an outer surface. The combustor liner is the second component, and the outer surface of the combustor liner is the second component surface. The turbine nozzle downstream of the combustor, the turbine nozzle is the first component.

The gas turbine engine of any preceding clause, wherein the combustor is configured to have an airflow over the outer surface of the combustor. The airflow is configured to contact the seal member. When the airflow contacts the seal member, the airflow provides a biasing force to press the first contact surface towards the first component surface.

The gas turbine engine of any preceding clause, further including a spring configured to apply a biasing force to the seal member to press the second contact surface towards the outer surface of the combustor liner.

The gas turbine engine of any preceding clause, wherein the combustor is an annular combustor having an axial direction and a radial direction. The turbine nozzle includes a flange. The first component surface is a radial surface of the flange.

The gas turbine engine of any preceding clause, wherein the seal member is configured to allow a controlled amount of air therethrough. The turbine nozzle includes an outer band. The flange is connected to the outer band by a transition section of the outer band. The transition section is configured to promote laminar flow along an inside surface of the outer band.

The gas turbine engine of any preceding clause, wherein the seal member has an axial leg and a radial leg. The first contact surface is an axial contact surface on the axial leg. The second contact surface is a radial contact surface on the radial leg.

The gas turbine engine of any preceding clause, wherein the seal member has one of an L-shape, a J-shape, a C-shape, or a U-Shape.

The gas turbine engine of any preceding clause, further including a spring configured to apply a biasing force to the seal member to press the second contact surface towards the outer surface of the combustor liner. The spring is retained by the flange.

The gas turbine engine of any preceding clause, wherein the flange includes an inner portion and an outer portion. The inner portion and the outer portion defining a groove. The spring is retained with in the groove.

The gas turbine engine of any preceding clause, further including a post connected to the seal member. The spring is configured to impart the biasing force to the post.

Although the foregoing description is directed to the preferred embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. A sealing system for sealing between components, the sealing system comprising:

a first component including a first component surface;

a second component including a second component surface, the second component surface being oriented in a direction transverse to the first component surface, the second component having an axis and axial direction, the axial direction being transverse to the first component surface;

a seal assembly including a seal member having a plurality of contact surfaces including a first contact surface and a second contact surface, the first contact surface being configured to contact the first component surface and to slide relative to the first component surface, the second contact surface being configured to contact the second component surface and to slide relative to the second component surface, the second contact surface being oriented in a direction transverse to the first contact surface; and a spring positioned to apply a biasing force to press the second contact surface into contact with the second component surface, the biasing force being applied in a direction transverse to the axial direction, wherein the first component includes an inner portion and an outer portion relative to the axis of the second component, the inner portion and the outer portion defining a groove, the spring being retained with in the groove.

2. The sealing system of claim 1, wherein the seal member has one of an L-shape, a J-shape, a C-shape, a U-Shape.

3. The sealing system of claim 1, wherein the first component includes a flange, the first component surface being a surface of the flange.

4. The sealing system of claim 1, wherein the seal member is configured to have another biasing force applied thereto to press the first contact surface into contact with the first component surface.

5. The sealing system of claim 4, wherein the seal member is configured to have an airflow contact the seal member and, when the airflow contacts the seal member, the airflow provides the biasing force to press the first contact surface into contact with the first component surface.

6. A gas turbine engine comprising:

the sealing system of claim 1; and a combustor including a combustor liner, the combustor liner having a plurality of portions including an upstream portion and a downstream portion, the upstream portion being the second component and the downstream portion being the first component.

7. A gas turbine engine comprising:

an annular combustor including a combustor liner having an outer surface, the combustor liner being the second component and the outer surface of the combustor liner being the second component surface, the annular combustor having a circumferential direction;

a turbine nozzle downstream of the annular combustor, the turbine nozzle being the first component, the turbine nozzle including a plurality of nozzle sections, each nozzle section being arranged adjacent to another nozzle section in the circumferential direction, and each nozzle section including the sealing system of claim 1.

8. The gas turbine engine of claim 7, wherein the seal member of one seal assembly overlaps with the seal member of an adjacent seal assembly.

9. The gas turbine engine of claim 8, wherein the overlapping portions of adjacent seal assemblies have a shiplap shape.

10. A gas turbine engine comprising:

the sealing system of claim 1;

a combustor including a combustor liner having an outer surface, the combustor liner being the second component and the outer surface of the combustor liner being the second component surface; and a turbine nozzle downstream of the combustor, the turbine nozzle being the first component.

11. The gas turbine engine of claim 10, wherein the combustor is configured to have an airflow over the outer surface of the combustor, the airflow being configured to contact the seal member and, when the airflow contacts the seal member, the airflow provides a biasing force to press the first contact surface towards the first component surface.

12. The gas turbine engine of claim 10, wherein the combustor is an annular combustor having a radial direction, wherein the turbine nozzle includes a flange, the first component surface being a radial surface of the flange.

13. The gas turbine engine of claim 12, wherein the seal member is configured to allow a controlled amount of air therethrough, and wherein the turbine nozzle includes an outer band, the flange being connected to the outer band by a transition section of the outer band, the transition section being configured to promote laminar flow along an inside surface of the outer band.

14. The gas turbine engine of claim 12, wherein the seal member has an axial leg and a radial leg, the first contact surface being a radial contact surface on the radial leg, and the second contact surface being an axial contact surface on the axial leg.

15. The gas turbine engine of claim 14, wherein the seal member has one of an L-shape, a J-shape, a C-shape, or a U-Shape.

16. The gas turbine engine of claim 12, wherein the flange includes the inner portion and the outer portion.

17. The gas turbine engine of claim 16, further comprising a post connected to the seal member, the spring being configured to impart the biasing force to the post.

18. The sealing system of claim 1, wherein the biasing force is applied in a direction orthogonal to the second contact surface.

19. The sealing system of claim 1, wherein the seal member is configured to allow a controlled amount of air therethrough.

* * * * *